United States Patent
Arulraja et al.

(10) Patent No.: US 8,573,336 B2
(45) Date of Patent: Nov. 5, 2013

(54) SUSPENSION FOR A MACHINE

(75) Inventors: Mylvaganam Arulraja, Cary, NC (US);
Michael S. Freberg, Raleigh, NC (US);
Leslie L. Weaver, Jr., Raleigh, NC (US);
Michael C. Layko, Apex, NC (US);
Jeffrey M. Parker, Fuquay-Varina, NC (US); Michael Bottom, Holly Springs, NC (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/150,301

(22) Filed: Jun. 1, 2011

(65) Prior Publication Data

US 2011/0227309 A1 Sep. 22, 2011

Related U.S. Application Data

(63) Continuation of application No. 12/492,398, filed on Jun. 26, 2009, now Pat. No. 7,967,087.

(51) Int. Cl.
*B62D 55/08* (2006.01)

(52) U.S. Cl.
USPC .......... 180/9.5; 180/9.46; 180/9.52; 180/9.58

(58) Field of Classification Search
None
See application file for complete search history.

(56) References Cited

U.S. PATENT DOCUMENTS

| | | | |
|---|---|---|---|
| 3,601,424 A | 8/1971 | Badland | |
| 4,223,742 A | 9/1980 | Stark | |
| 5,788,265 A | 8/1998 | McLaughlin | |
| 5,842,757 A | 12/1998 | Kelderman | |
| 5,988,775 A | 11/1999 | Nordberg | |
| 6,247,547 B1 | 6/2001 | Lemke et al. | |
| 6,322,171 B1 | 11/2001 | Fornes | |
| 6,435,291 B2 | 8/2002 | Lemke et al. | |
| 6,435,292 B2 | 8/2002 | Lemke et al. | |
| 6,497,460 B2 | 12/2002 | Lemke et al. | |
| 6,588,778 B1 | 7/2003 | McLaughlin | |
| 6,877,728 B2 | 4/2005 | Gheret | |
| 6,905,130 B2 | 6/2005 | Few | |
| 6,913,329 B1 | 7/2005 | Rodgers et al. | |
| 7,261,287 B2 | 8/2007 | Gehret | |
| 2001/0004947 A1 | 6/2001 | Lemke et al. | |
| 2001/0030068 A1 | 10/2001 | Nagorkca et al. | |
| 2001/0040058 A1 | 11/2001 | Lemke et al. | |
| 2003/0034189 A1 | 2/2003 | Lemke et al. | |
| 2003/0226697 A1 | 12/2003 | Haringer | |
| 2004/0099451 A1 | 5/2004 | Nagorcka et al. | |
| 2005/0110346 A1 | 5/2005 | Albright et al. | |
| 2005/0121207 A1 | 6/2005 | Juncker | |
| 2005/0145422 A1 | 7/2005 | Loegering et al. | |
| 2005/0231035 A1 | 10/2005 | Vertoni | |
| 2005/0252592 A1 | 11/2005 | Albright et al. | |

FOREIGN PATENT DOCUMENTS

| | | |
|---|---|---|
| EP | 493875 | 7/1992 |
| EP | 1523438 | 7/2003 |
| EP | 1564119 | 8/2005 |

*Primary Examiner* — Tashiana Adams
*Assistant Examiner* — Marlon Arce
(74) *Attorney, Agent, or Firm* — Miller, Matthias & Hull

(57) ABSTRACT

A machine is provided. The machine has a forward direction of travel and includes a frame, at least one lift arm, a first torsion axle assembly, an undercarriage, and an endless track. The lift arm is pivotally attached to the frame. The first torsion axle assembly is attached to the frame and includes a first torsion arm, a first torsion shaft, and a first axle, with the first torsion shaft and the first axle extending from the first torsion arm. The undercarriage is attached to the first torsion axle assembly and the endless track encircles the undercarriage. One of the first torsion shaft and the first axle is attached to the frame and the other of the first torsion shaft and the first axle is attached to the undercarriage. The first torsion arm extends upward from the frame at an angle between 90 and 180 degrees from the forward direction of travel.

16 Claims, 10 Drawing Sheets

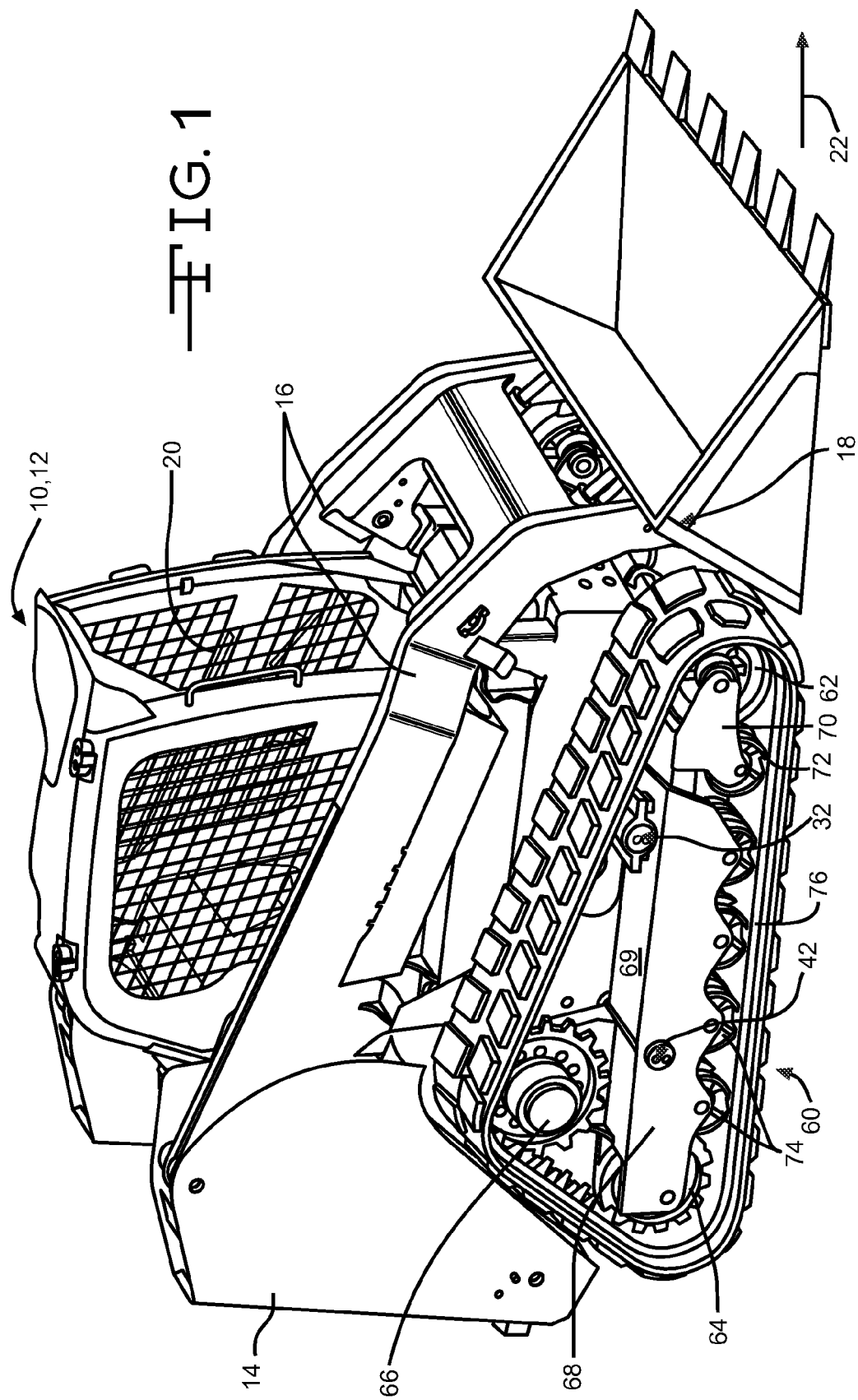

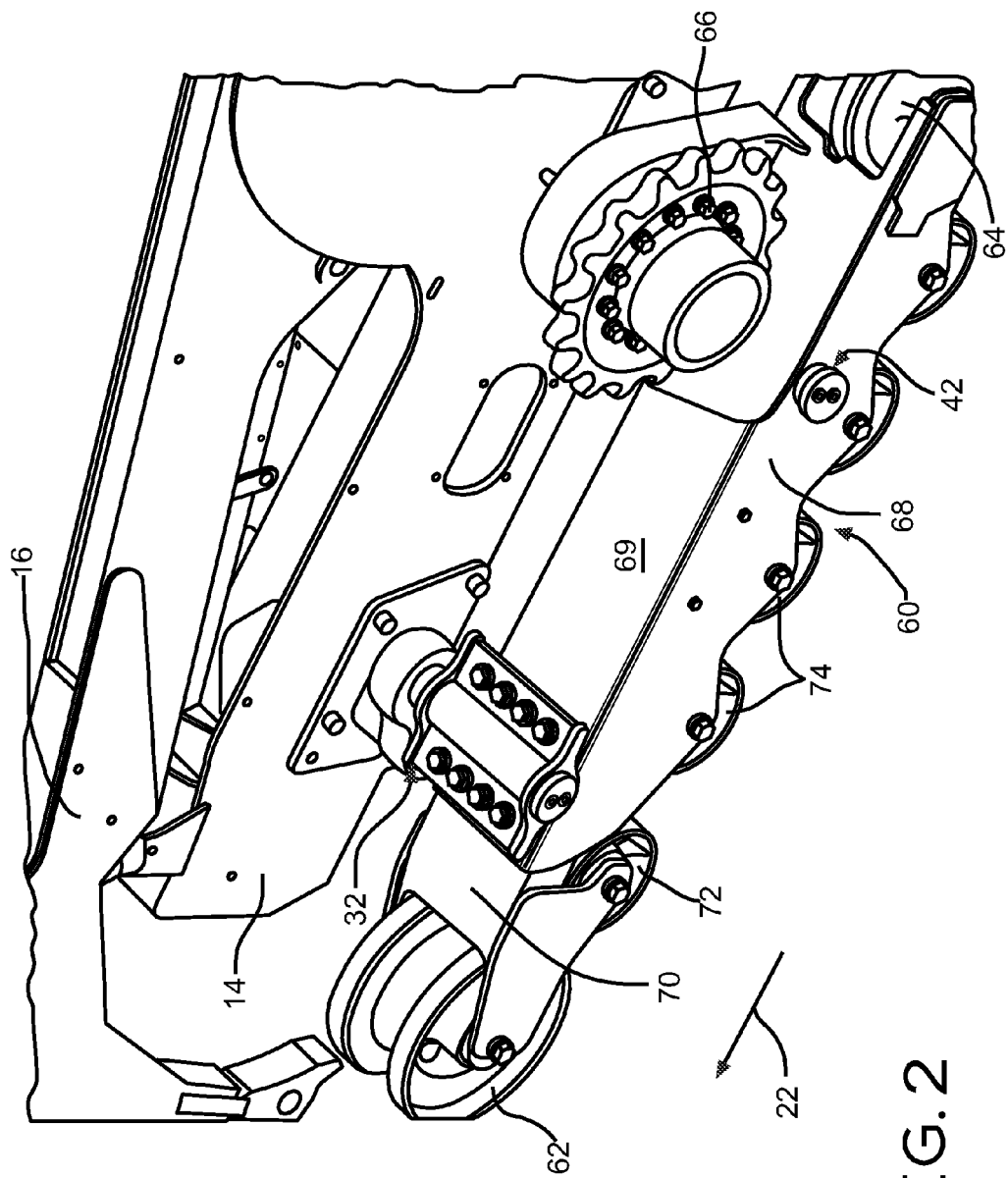

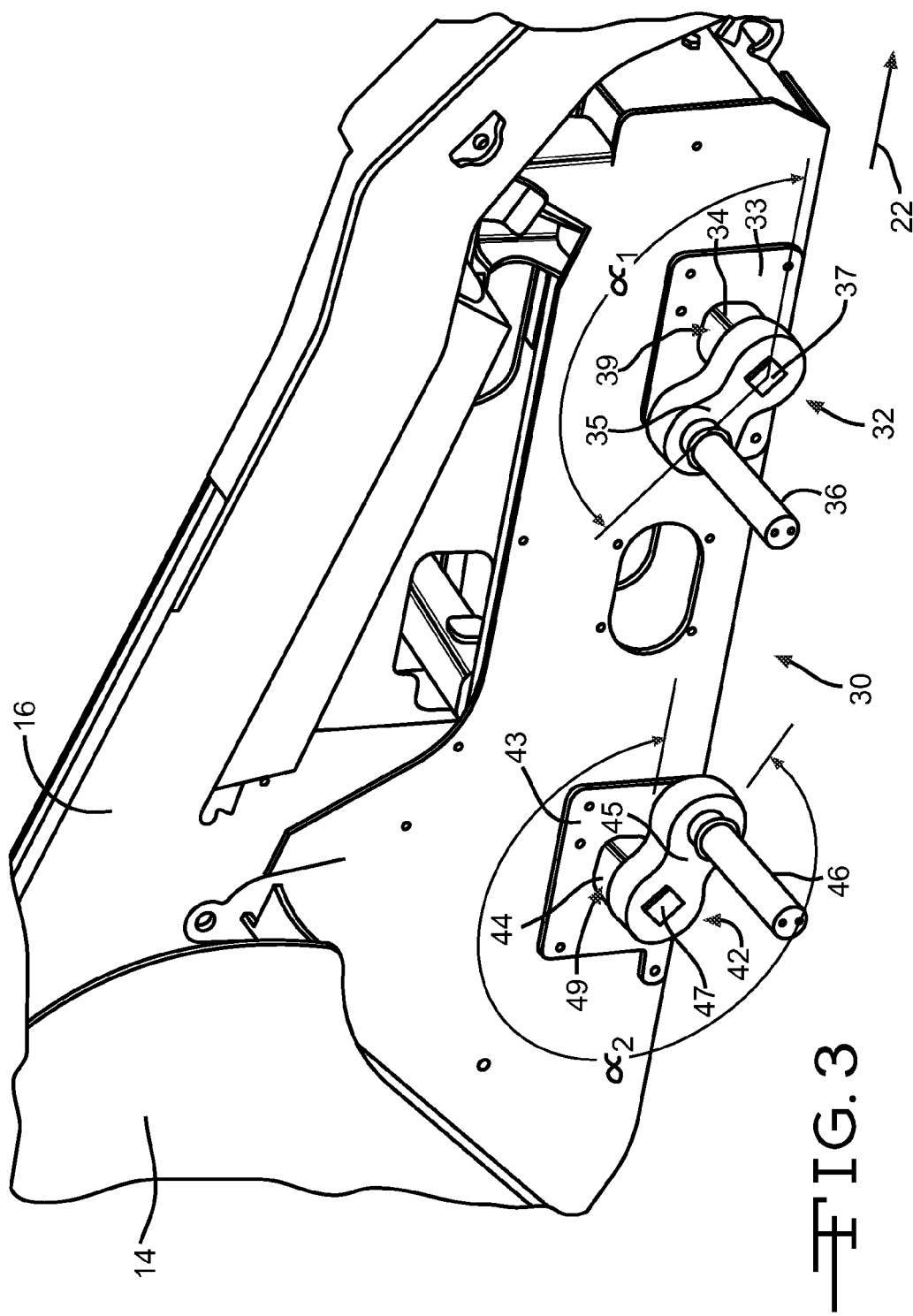

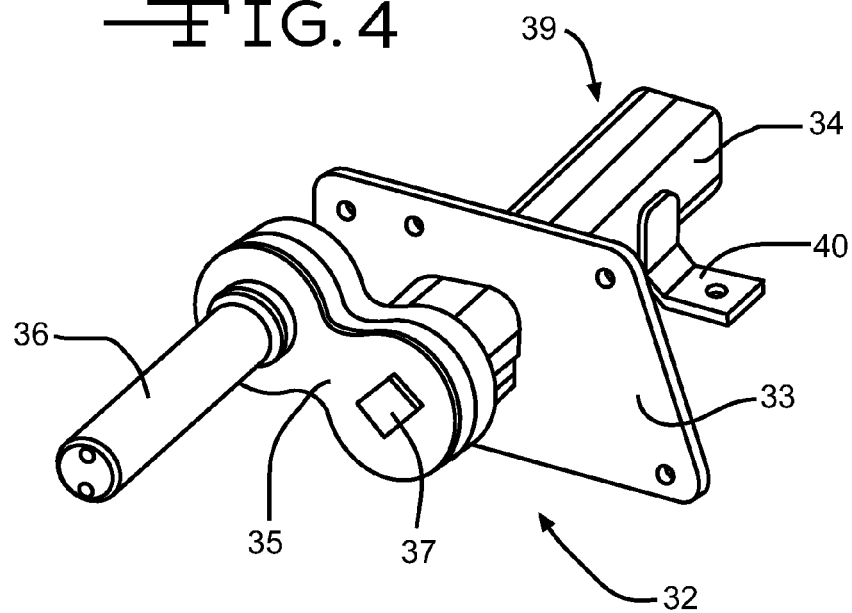
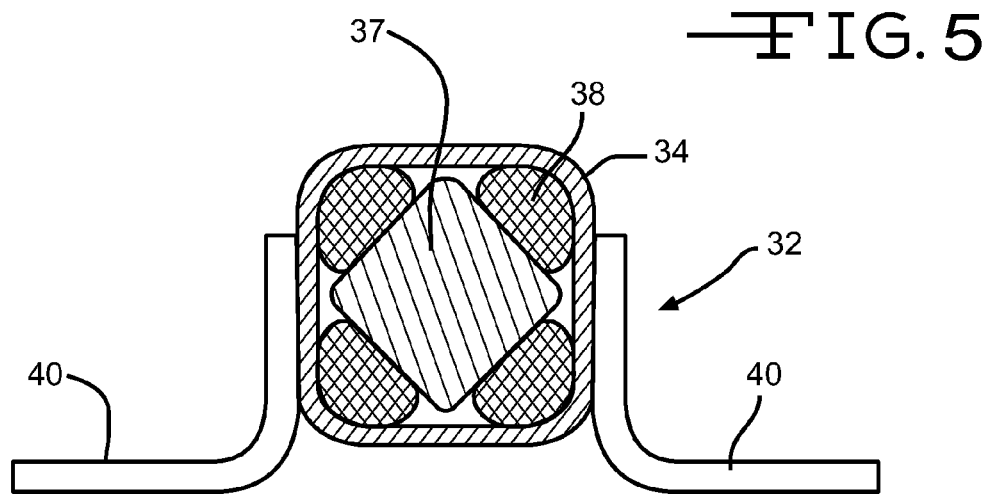

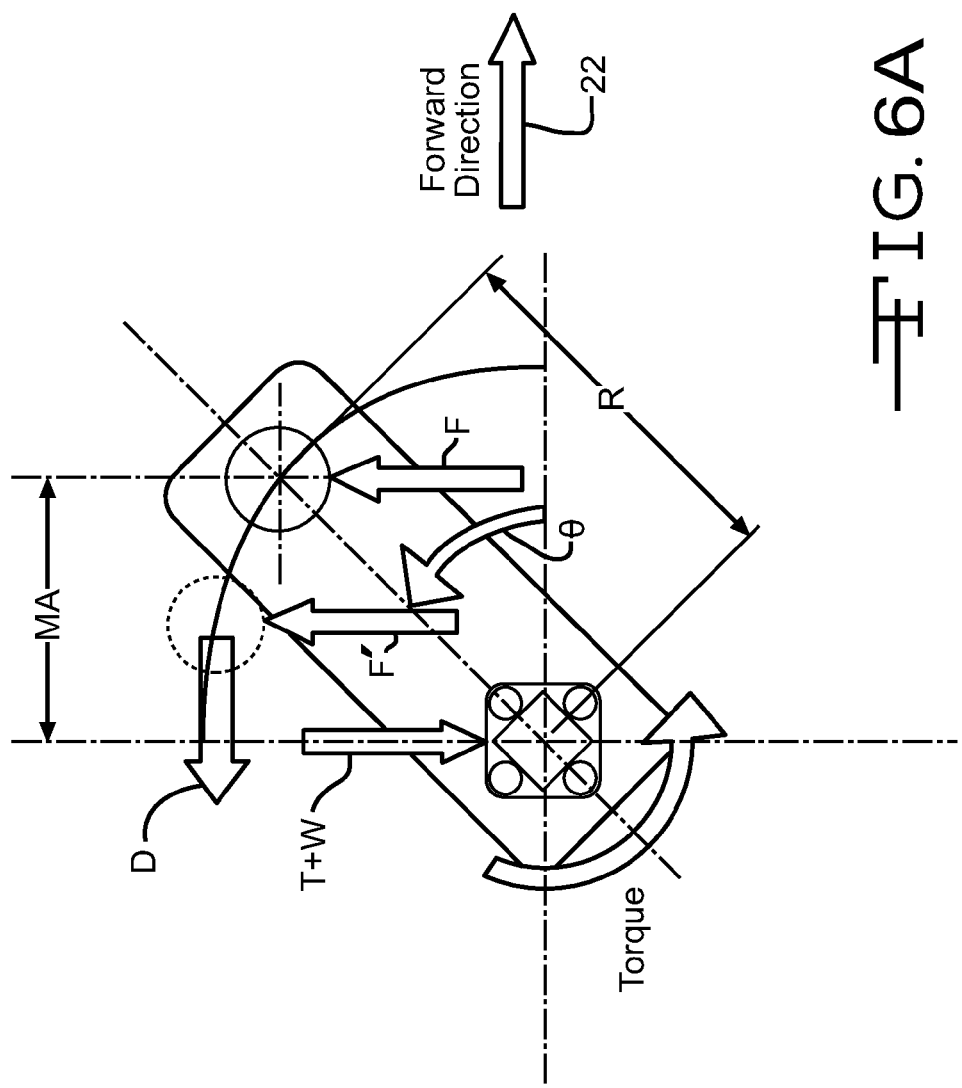

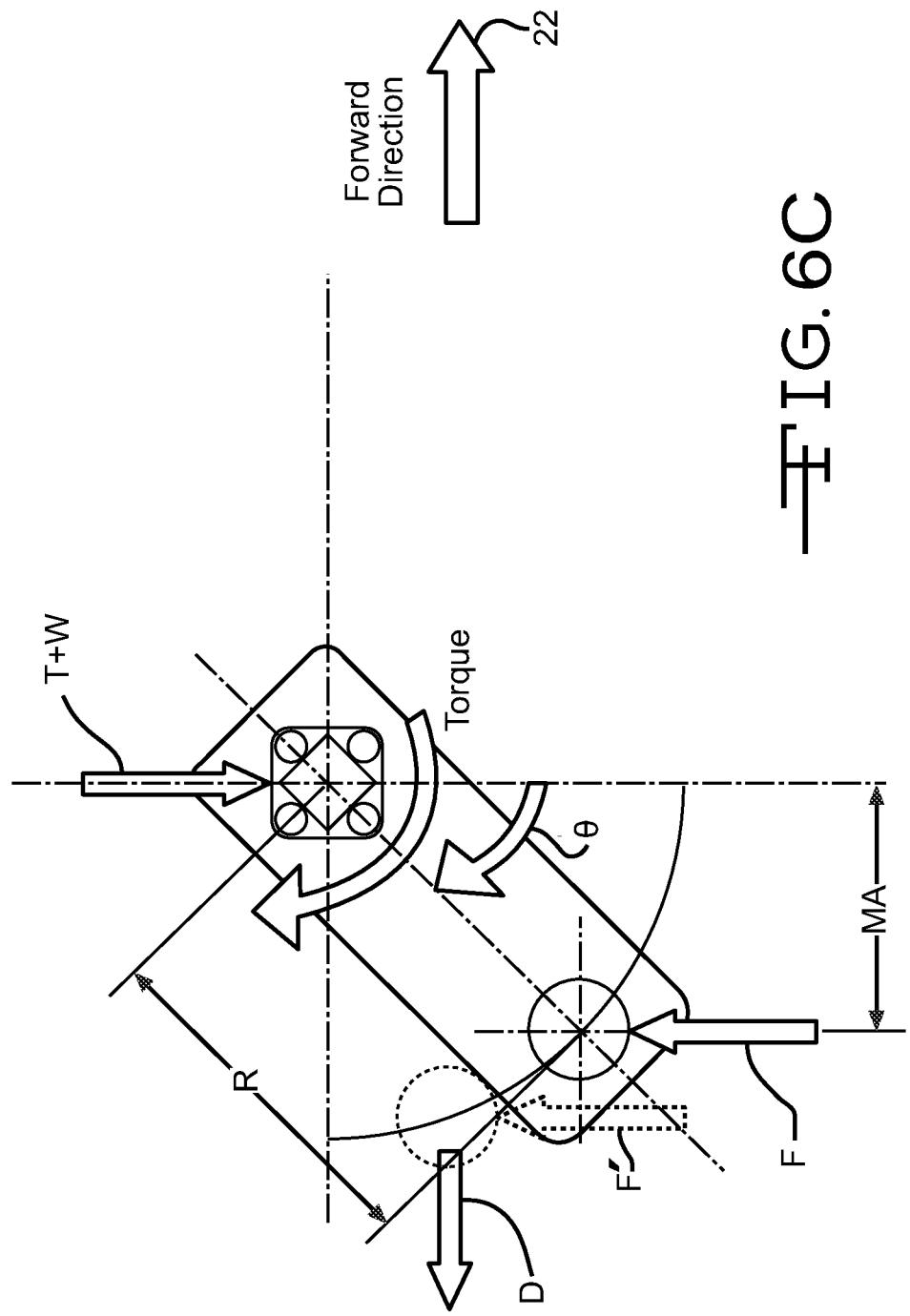

SUSPENSION FOR A MACHINE

CROSS-REFERENCE TO RELATED APPLICATIONS

This patent application is a Continuation of U.S. patent application Ser. No. 12/492,398, filed Jun. 26, 2009.

TECHNICAL FIELD

This disclosure relates generally to a suspension for a machine, and more particularly, to a suspension for a tracked skid steer loader.

BACKGROUND

Skid steer loaders are highly maneuverable compact machines used in a variety of applications ranging from asphalt milling to earth moving, depending on the job and type of attachment being used. For applications requiring reduced ground pressure or increased fraction, tracked skid steer loaders have been developed. These tracked skid steer loaders, such as compact track loaders and multi-terrain loaders, have rubber-tracked undercarriages that support a machine frame and transfer the powertrain and implement forces to the ground. Typical compact track loaders, which have a rubber over steel track, use a rigid mounting from the undercarriage to the machine frame. While this rigid mounting allows for an efficient transfer of machine power to the implement, it results in an uncomfortable ride for the operator and a reduction in machine performance when the tracks do not maintain full contact with the ground.

Multi-terrain loaders, which use a solid rubber track, have been developed with suspension systems. For example, U.S. Pat. No. 6,435,291 to Lemke et al., entitled *Suspension and Drive Mechanism for Multi-Surface Vehicle*, ("Lemke"), discloses a tracked vehicle that produces a reduced ground pressure for traveling over soft ground surfaces without damaging the surface. The disclosed track vehicle uses an undercarriage having torsion axles arranged in a five-bar linkage with the machine frame.

While this configuration may work adequately for applications seeking a reduced ground pressure, the five-bar linkage suspension disclosed in Lemke may not be suitable for applications requiring an efficient transfer of machine power to the implement, such as grading.

SUMMARY

In one aspect of the present disclosure, a machine is provided. The machine has a forward direction of travel and includes a frame, at least one lift arm, a first torsion axle assembly, an undercarriage, and an endless track. The lift arm is pivotally attached to the frame. The first torsion axle assembly is attached to the frame and includes a first torsion arm, a first torsion shaft, and a first axle, with the first torsion shaft and the first axle extending from the first torsion arm. The undercarriage is attached to the first torsion axle assembly and the endless track encircles the undercarriage. One of the first torsion shaft and the first axle is attached to the frame and the other of the first torsion shaft and the first axle is attached to the undercarriage. The first torsion arm extends upward from the frame at an angle between 90 and 180 degrees from the forward direction of travel.

In another aspect of the present disclosure, a suspension for a machine is provided. The machine has a forward direction of travel, a frame, at least one lift arm pivotally attached to the frame, an undercarriage supporting the frame, and an endless track encircling the undercarriage. The suspension includes a first torsion axle assembly and a second torsion axle assembly. The first torsion axle assembly is configured to be attached to the frame and attached to the undercarriage and includes a first torsion arm, a first torsion shaft, and a first axle. The first torsion shaft and the first axle extend from the first torsion arm. The second torsion axle assembly is configured to be attached to the frame and attached to the undercarriage and includes a second torsion arm, a second torsion shaft, and a second axle. The second torsion shaft and the second axle extend from the second torsion arm. The second torsion axle assembly is positioned rearward of the first torsion axle assembly along the forward direction of travel. One of the first torsion shaft and the first axle is configured to be attached to the frame and the other of the first torsion shaft and the first axle is attached to the undercarriage. The first torsion arm extends upward from the frame at an angle between 90 and 180 degrees from the forward direction of travel.

In a third aspect of the present disclosure, a method of providing a suspension for a machine is provided. The machine has a forward direction of travel and an undercarriage, and at least one lift arm attached to a frame of the machine. The method also includes the step of providing a first torsion axle assembly including a first torsion arm, a first torsion shaft, and a first axle. The first torsion shaft and the first axle extend from the first torsion arm. The method also includes the step of attaching one of the first torsion shaft and the first axle to the frame and the other of the first torsion shaft and the first axle to the undercarriage such that the first torsion arm extends upward from the frame at an angle between 90 and 180 degrees from the forward direction of travel.

BRIEF DESCRIPTION OF THE DRAWINGS

FIG. 1 is a perspective view of a machine having a suspension system suitable for use with the present disclosure;

FIG. 2 is a perspective view of the undercarriage of the machine of FIG. 1, with the endless track shown removed;

FIG. 3 is a perspective view of the machine of FIG. 1, with the undercarriage shown removed;

FIG. 4 is a perspective view of the front torsion axle of FIG. 3;

FIG. 5 is cross-section view of the torsion shaft of the front torsion axle of FIG. 4;

FIG. 6A is a diagram showing the forces on a torsion axle oriented in the first quadrant;

FIG. 6C is a diagram showing the forces on a torsion axle oriented in the third quadrant;

DETAILED DESCRIPTION

Figure 6:
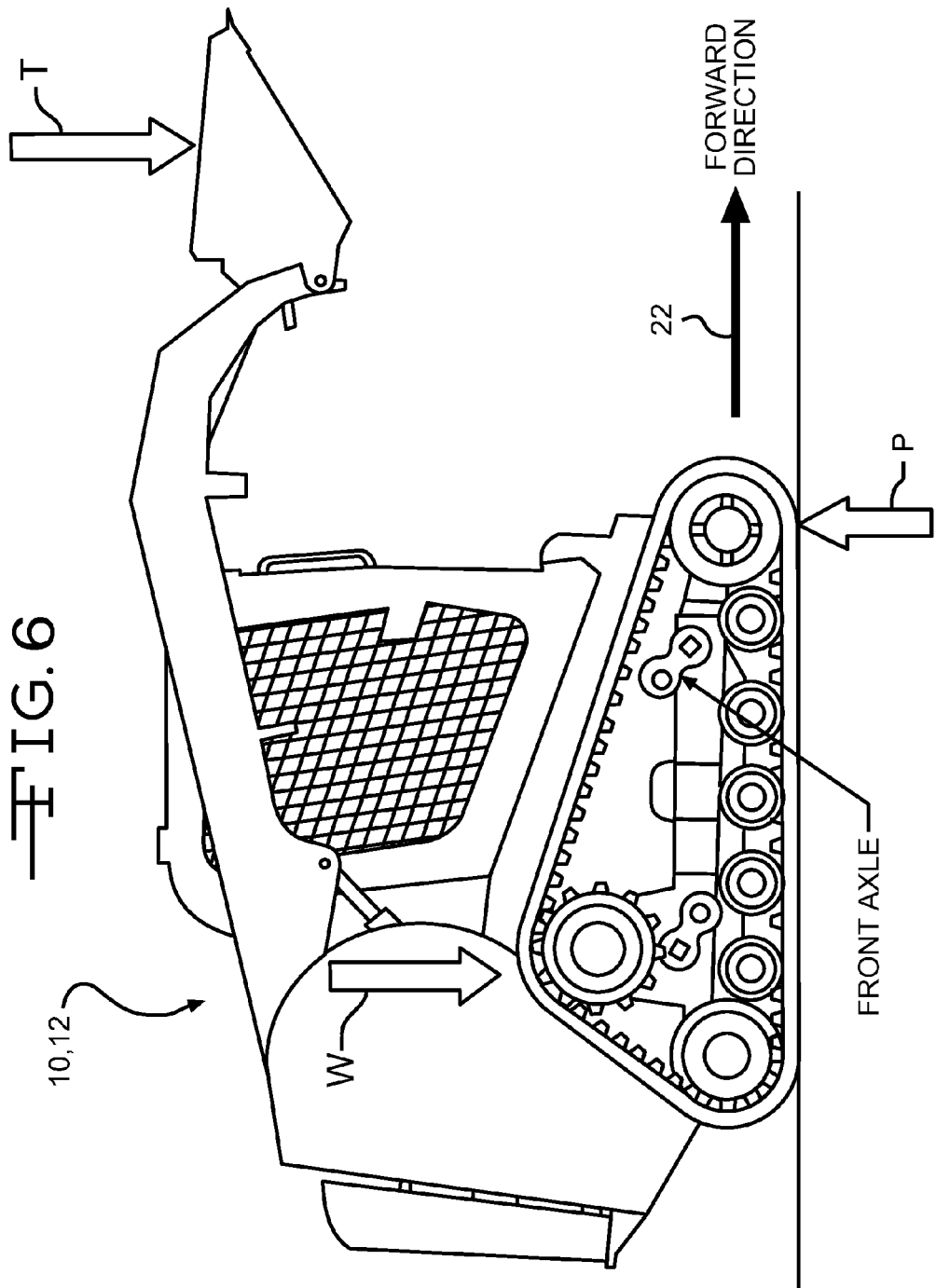
FIG. 6 is a diagram illustrating the forces acting on a machine of FIG. 1 as the machine raises its implement.

A machine 10, such as a compact track loader 12, in accordance with the present disclosure is illustrated in FIG. 1. As shown, the machine 10 has a forward direction of travel 22 and includes a machine frame 14, an operator compartment 20, and a pair of lift arms 16 pivotally attached to the machine frame 14. The lift arms 16 are shown pivotally mounted to a rear portion of the machine frame 14, behind the operator compartment 20 with respect to the forward direction of travel 22. An implement 18, shown as a bucket, is coupled to the lift arms 16.

The machine frame 14 is mounted to an undercarriage 60 through a suspension system 30 (shown in FIG. 3) including a pair of first and second torsion axle assemblies 32, 42 (only one side shown). As seen in FIGS. 1-2, the undercarriage 60 includes a front and a rear idler 62, 64, a drive sprocket 66, a roller frame 68, a moveable frame 70, a first roller 72, and a plurality of rollers 74. The rear idler 64 and the plurality of rollers 74 are rotatably mounted to the roller frame 68. The drive sprocket 66 is rotatably mounted to an upper surface 69 of the roller frame 68. The front idler 62 and the first roller 72 are rotatably mounted to the moveable frame 70. The moveable frame 70 is translatably attached to the roller frame 68. A grease ram (not shown) or other track recoil system may be used to absorb any recoil or track length changes. As illustrated in FIGS. 1-2, the rear idler 64 and the drive sprocket 66 are fixed with respect to the roller frame 68, while the front idler 62 and the first roller 72 are moveable with respect to the roller frame 68.

As seen in FIG. 1, an endless track 76 encircles the undercarriage 60. Specifically, the endless track 76 encircles the front idler 62, the rollers 72, 74, the rear idler 64, and the drive sprocket 66. The rollers 72, 74 distribute the weight of the machine 10 and implement 18 uniformly over the endless track 76. The endless track 76 may be a compact track loader track, having a rubber over steel drive lug construction. Alternatively, the endless track 76 may be a solid rubber track having reinforcing belts or transverse rods, such as a multi-terrain loader track having rubber drive lugs, or a steel track consisting of a steel link assembly with steel track shoes.

Referring now to FIG. 3, the suspension system 30 of the machine 10 is illustrated. The suspension system 30 includes the pair of front torsion axle assemblies 32 and the pair of rear torsion axle assemblies 42 (with only one side shown). Each torsion axle assembly 32, 42 includes a mounting flange 33, 43, a torsion arm 35, 45, a torsion shaft 39, 49, and an axle 36, 46. The mounting flanges 33, 43 are attached to the machine frame 14 and rotationally lock the torsion shafts 39, 49. Each torsion shaft 39, 49 is mounted to and extends from one end of its respective torsion arm 35, 45. The axles 36, 46 extend from the other end of the torsion arms 35, 45. As seen in FIG. 3, the intersection of the front torsion arm 35 and the forward direction of travel 22 centered about the frame 14 forms a counterclockwise angle of $\alpha 1$. Described another way, the first torsion arm 35 extends upward from the frame 14 at an angle of $\alpha 1$ from the forward direction of travel 22. As described in detail below, $\alpha 1$ may be an angle between 90 and 180 degrees. In another embodiment, $\alpha 1$ may more particularly be an angle between 120 and 150 degrees. In general, it may be desired to keep $\alpha 1$ away from the endpoints of a quadrant range (i.e. 90, 180, 270, and 360 degrees) to prevent the four-bar suspension linkage formed by the machine frame 14, the undercarriage 60, and the front and rear torsion arms 35, 45 from going over center and locking up, or from undesirable machine oscillations.

Similarly, as seen in FIG. 3, the intersection of the rear torsion arm 45 and the forward direction of travel 22 centered about the frame 14 forms a counterclockwise angle of $\alpha 2$. Alternately phrased, the second torsion arm 45 extends downward from the frame 14 at an angle of $\alpha 2$ from the forward direction of travel 22. As illustrated in FIG. 3, $\alpha 2$ is an angle between 270 and 360 degrees, and in another embodiment, $\alpha 2$ may more particularly be an angle between 300 and 330 degrees. However, depending on space constraints and application, the angle $\alpha 2$ may also be an angle between 90 and 180 degrees, and in another embodiment, may more particularly be an angle between 120 and 150 degrees. In order for the four-bar suspension linkage formed by the machine frame 14, the undercarriage 60, and the front and rear torsion arms 35, 45 to function correctly, if $\alpha 1$ is an angle between 90 and 180 degrees as stated above, $\alpha 2$ should be an angle between 270 and 360 degrees or between 90 and 180 degrees. The measurement of $\alpha 1$ and $\alpha 2$ may be done while the implement 18 of the machine 10 is in an unloaded state and the machine 10 is stationary on level ground. In one application, the torsion arms 35, 45 have a length of 6 inches, measured from the center of the torsion shafts 39, 49 to the center of the axles 36, 46, although other lengths may be used for other applications, depending on the desired suspension travel, space constraints, and machine loading versus spring capability.

FIGS. 4-5 illustrate the details of the torsion axle assemblies 32, 42. The torsion shaft 39 of the torsion axle assembly 32 has a hollow outer tube 34, 44 attached to the machine frame 14 via the mounting flange 33, 43 and brackets 40. An inner square bar 37, 47 and rubber cords 38 are positioned within the outer tube 34, 44. The inner square bar 37, 47 is rotationally attached to one end of the torsion arms 35, 45. As the torsion arms 35, 45 are rotated by movement of the undercarriage 60 and the axles 36, 46, the inner square bars 37, 47 also rotate. This rotation of the inner square bars 37, 47 is resisted by the rubber cords 38, which are fixed with respect to the outer tubes 34, 44 and exert a biasing torque on the inner square bar 37, 47 and the torsion arms 35, 45.

Referring back to FIG. 2, the axles 36, 46 that extend from the other end of the torsion arms 35, 45 are attached to the undercarriage 60 at the roller frame 68. The axle 36 is shown attached to the upper surface 69 of the roller frame 68, while the axle 46 is attached to and extends through the roller frame 68, although there are many other methods of attaching the axles 36, 46 to the roller frame 68.

The machine 10 also includes an engine that powers a drive system (neither shown). The engine is attached to the rear of the machine frame 14 with respect to the forward direction of travel 22. The engine may be a diesel engine or any other engine known in the art, such as a gasoline engine, a gaseous fuel driven engine, or any other engine known in the art. It is also contemplated that the engine may alternately include another source of power such as a fuel cell, a power storage device, an electric or hydraulic motor, and/or another source of power known in the art. The engine may be operatively connected to the drive system by any suitable manner known in the art, such as, for example, gearing, a countershaft, and/or a belt.

The drive system (not shown) in the machine 10 may be a dual-path hydrostatic transmission, although other transmissions known in the art may also be used, such as a mechanical or electrical variable-speed drive or gear-type transmissions. The drive system may include a pair of variable displacement pumps and a left and a right drive motor coupled to the drive sprocket 66. The variable displacement pumps supply pressurized hydraulic fluid through supply lines to drive the left and right drive motors, which turn the drive sprockets 66.

INDUSTRIAL APPLICABILITY

The disclosed suspension system for a machine may be used to provide a suspension for any tracked machine having an implement that is raised and lowered to perform a desired task. In one exemplary embodiment, the suspension system is for a compact track loader.

During operation of the machine 10, an operator (not shown) can independently control the speed and direction of the left and right endless tracks 76 (only one side shown) to control the speed and direction of the machine 10. The engine supplies power to the variable displacement pumps of the drive system, which supply pressurized hydraulic fluid to the drive motors and turn the drive sprockets 66.

As the machine 10 travels over uneven ground, impacts to the undercarriage 60 may be absorbed by the suspension system 30 before reaching the machine frame 14 and operator compartment 20. The torsion axle assemblies 32, 42 of the suspension system are oriented to provide good machine tipping characteristics while at the same time good suspension characteristics. FIGS. 6, 6A-6D and FIG. 7 illustrate the effects of machine tipping and load characteristics as the torsion arms 35, 45 are in varying angular orientations. FIG. 6 is a diagram illustrating the tipping load "T," the machine weight "W" applied to the machine center of gravity, and the reaction tipping force "P" about the front idler 62. The combined force of T+W is applied to the torsion shaft 39, 49 of the torsion axle assembly 32, 42, while the reaction tipping force F is applied to the axle 36, 46 of the torsion axle assembly 32, 42 in FIGS. 6A-6B, described below.

FIG. 6A is a free body diagram illustrating the forces on a torsion axle assembly 32, 42 oriented in the first quadrant, with the intersection of the torsion arm 35, 45 and the forward direction of travel 22 centered about the frame 14 forming a counterclockwise angle between 0 and 90 degrees, measured by the angle "θ". The distance "R" is the length of the torsion arm 35, 45 as measured by the distance between the center point of the torsion shaft 39, 49 and the center point of the axle 36, 46. The Moment Arm "MA" is the horizontal distance between the center point of the torsion shaft 39, 49 and the center point of the axle 36, 46, and may be calculated by the formula: MA=R cosine θ. "F" is the reaction force from the undercarriage 60 applied to the axle 36, 46 of the torsion axle assembly 32, 42. As F is applied to the torsion axle assembly 32, 42, it creates a torque about the torsion shaft 39, 49, and may be calculated by the formula: Torque=F×MA. Similarly, "F'" is the reaction force from the undercarriage 60 applied to the axle of the torsion axle assembly when the torsion arm is at a second angular position, when the machine is in a loaded state. "D" is the direction that the axle has moved with respect to the forward direction of travel 22.

Figure 7:
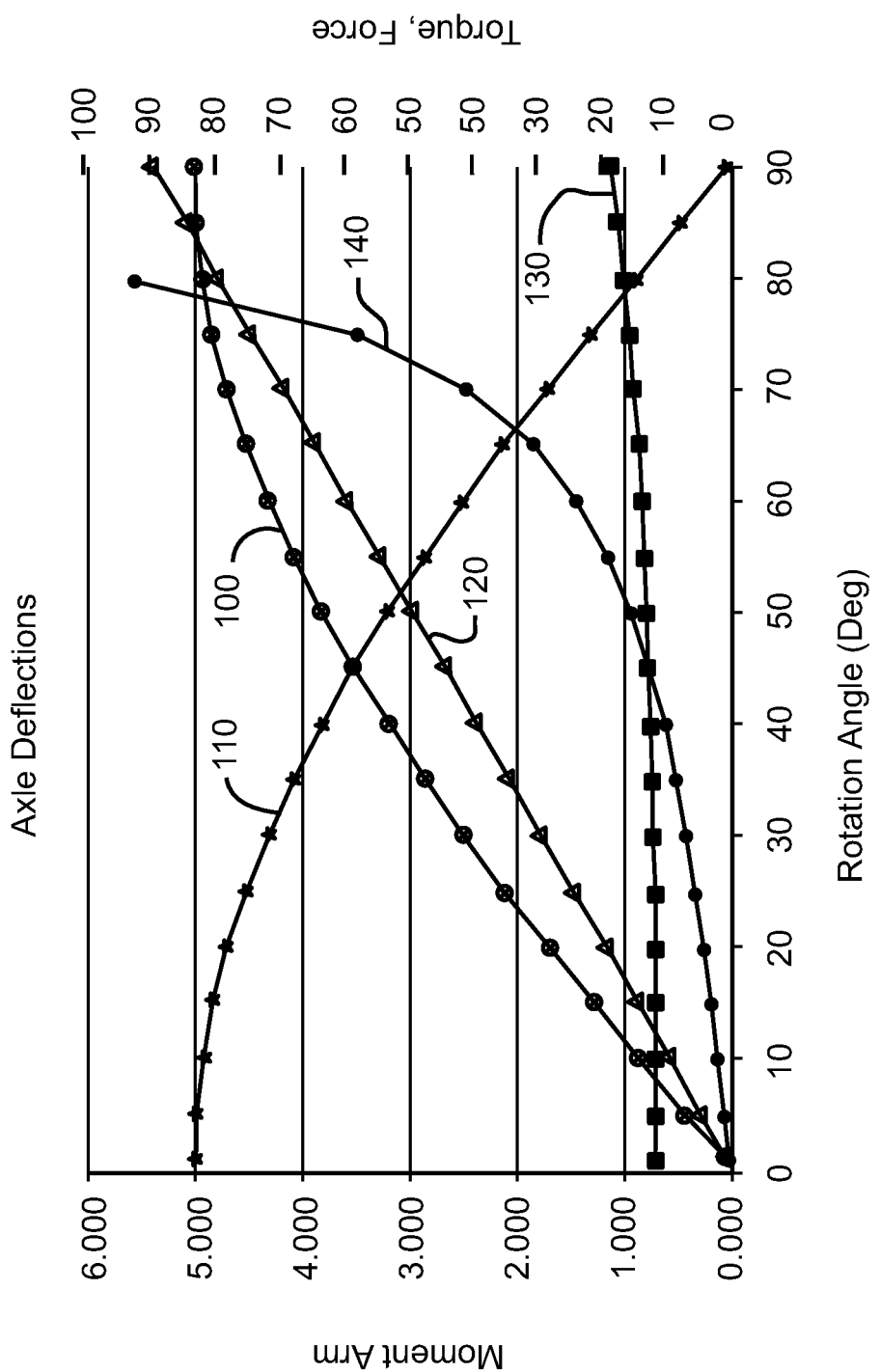
FIG. 7 is a graph showing the Moment Arms, Torques, and Forces of FIGS. 6A-6D plotted against rotation angle deflection of a torsion axle in degrees.

FIG. 7 plots F, Torque, and MA versus rotation angle θ of FIG. 6A in plots 140, 120, and 110, respectively. From the FIG. 7 plots, several conclusions may be drawn. From the plot of 120, Torque versus rotation angle θ is shown to have a linear response, so that as the rotation angle θ of the torsion arm 35, 45 increases, the reaction torque increases at the same rate. For simplification purposes, this is an assumed characteristic of the torsion spring in the axle; the actual spring rate can vary from this assumption without significantly affecting the stated conclusions. Next, plot 110 follows a cosine relationship as the moment arm MA is plotted against the rotation angle θ. When the force F is plotted against the rotation angle θ in plot 140, calculated by the formula F=Torque/MA, a rising force curve is shown. This rising force curve is desirable as it takes an increasing reaction force from the interaction of the undercarriage 60 and the ground to cause an increase in the deflection of the torsion arms 35, 45.

However, positioning a torsion arm 35, 45 with a first quadrant orientation, so that it extends upward from the frame 14 at an angle between 0 and 90 degrees from the forward direction of travel 22, may not be ideal when the tipping point of the machine 10 is analyzed. As seen when the suspension of a torsion arm 35, 45 is loaded, the reaction force at the loaded point F' shifts rearward along direction "D" relative to the forward direction of travel 22. This rearward shift "D" of the reaction force F is not desirable as it becomes easier for a machine to tip about the front idler 62 as the lift arms 16 are raised with a tipping load.

Figure 6B:
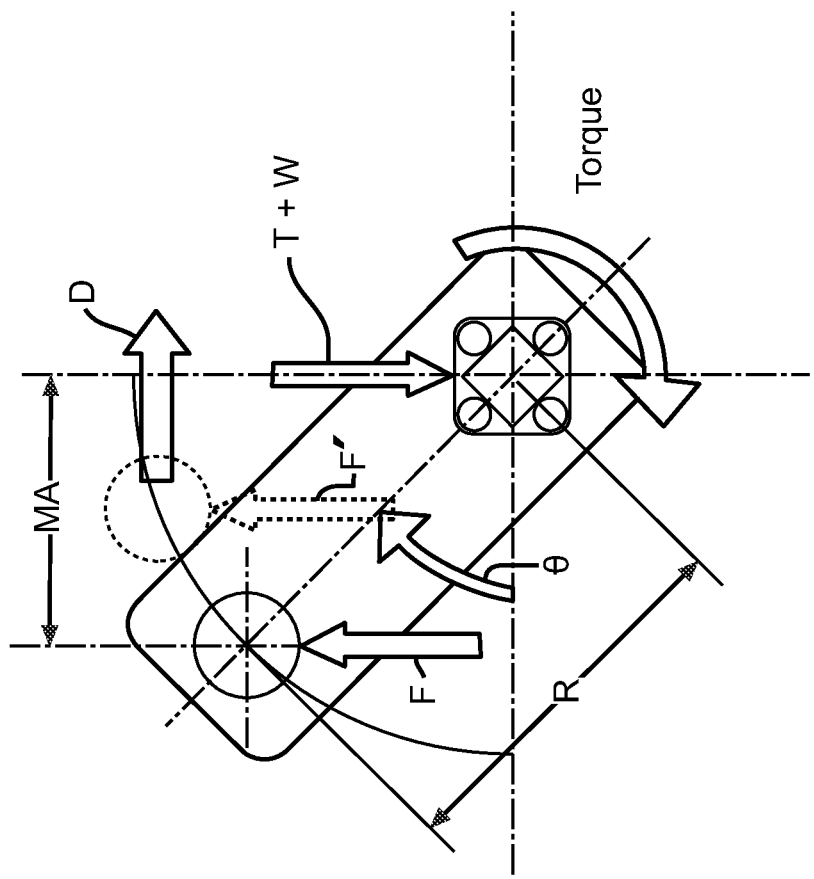
FIG. 6B is a diagram showing the forces on a torsion axle oriented in the second quadrant.

FIG. 6B is a free body diagram showing the forces on a torsion axle assembly 32, 42 oriented in the second quadrant, with the intersection of the torsion arm 35, 45 and the forward direction of travel 22 centered about the frame 14 forming a counterclockwise angle between 90 and 180 degrees. The angle "θ" is the angle between MA and R, and supplementary to α1 or α2 (as seen in FIG. 3). The plots of F, Torque, and MA versus rotation angle θ (140, 120, 100) are identical to those described for FIG. 6A, above, with a rising force curve. This rising force curve is desirable as it takes an increasing reaction force from the interaction of the undercarriage 60 and the ground to cause an increase in the deflection of the torsion arms 35, 45.

However, in contrast to a first quadrant orientation, positioning a torsion arm 35, 45 with a second quadrant orientation provides an improved tipping point response as the suspension is loaded. As seen when the suspension of a torsion arm 35, 45 is loaded, the reaction force at the loaded point F' shifts forward relative to the load. This forward shift of the reaction force is desirable as it becomes harder for the machine 10 to tip about the front idler 62 as the lift arms 16 are raised with a tipping load. As a result of this and the rising force curve, this orientation is adopted for the front torsion axle assembly 32.

FIG. 6C is a diagram showing the forces on a torsion axle assembly 32, 42 oriented in the third quadrant, with the intersection of the torsion arm 35, 45 and the forward direction of travel 22 centered about the torsion shaft 39, 49 forming an angle between 180 and 270 degrees. The angle "θ" is the angle formed by the intersection of the vertical axis and R. Unlike FIGS. 6A-6B, the moment arm MA is calculated by the formula: MA=R sine θ. This results in new plots of MA and F versus rotation angle θ (plots 100 and 130, respectively, in FIG. 7), while the plot of the Torque curve 120 remains the same as described above. From these FIG. 7 plots, several conclusions may be drawn. Because plot 100 follows a sine relationship as the moment arm MA is plotted against the rotation angle θ, when the force F is plotted against the rotation angle θ (plot 130), a flat force curve is shown. This flat force curve is not desirable as it leads to a soft suspension, with minor changes in reaction force from the interaction of the undercarriage 60 and the ground causing large deflections in the torsion arms 35, 45.

As described above for FIG. 6A, positioning a torsion arm with a third quadrant orientation may not be ideal when the tipping point of the machine is analyzed. As seen when the suspension of a torsion arm is loaded, the reaction force at the loaded point F' shifts rearward along D relative to the load. This rearward shift of the reaction force is not desirable as it becomes easier for a machine to tip about the front idler 62 as the lift arms 16 are raised with a tipping load.

Figure 6D:
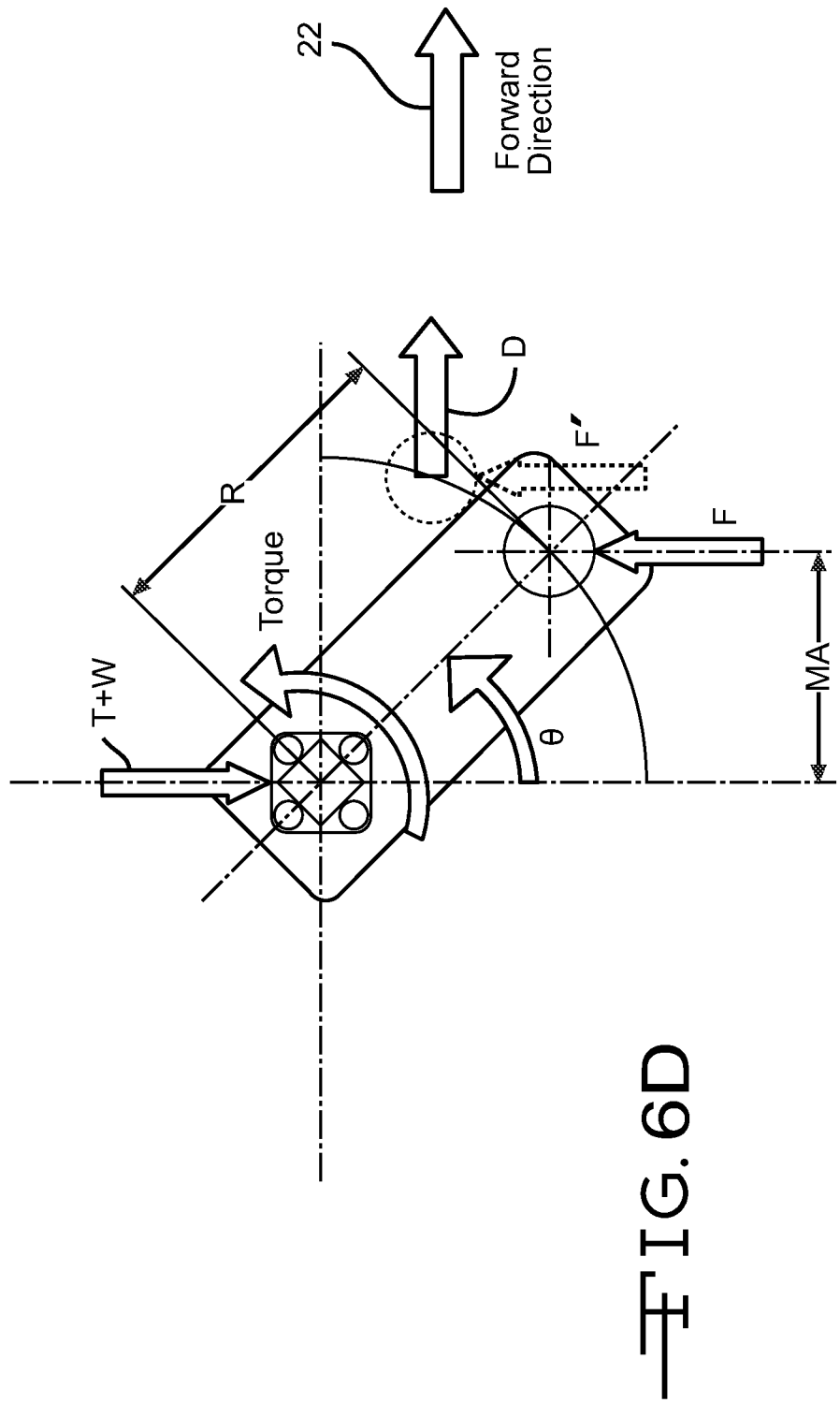
FIG. 6D is a diagram showing the forces on a torsion axle oriented in the fourth quadrant.

FIG. 6D is a diagram showing the forces on a torsion axle assembly 32, 42 oriented in the fourth quadrant, with the intersection of the torsion arm 35, 45 and the forward direction of travel 22 centered about the torsion shaft 39, 49 forming an angle between 270 and 360 degrees. The angle "θ" is the angle formed by the intersection of the vertical axis and R. As with FIG. 6C above, the moment arm MA is calculated by the formula: MA=R sine θ. While this results in a flat force curve as with third quadrant orientations, the tipping point characteristics are desirable. As described above for FIG. 6B, positioning a torsion arm with a fourth quadrant orientation provides an improved tipping point response as the suspension is loaded. As seen when the suspension of a torsion arm 35, 45 is loaded, the reaction force at the loaded point F' shifts forward along D relative to the load. This forward shift of the reaction force is desirable as it becomes harder for a machine to tip about the front idler 62 as the lift arms 16 are raised with a tipping load.

This configuration of the suspension system 30, with a second quadrant front torsion arm 35 orientation and a fourth quadrant rear torsion arm 45 orientation, allows for both a rising force curve and improved tipping characteristics with the front torsion arm 35, and improved tipping characteristics with the rear torsion arm 45. The rising force curve versus torsion arm angular deflection is desirable for machine applications where a suspension system is desired, but the machine application requires stiffness between the implement and the undercarriage. Examples requiring a suspension but stiffness between the implement and undercarriage are grading or other applications requiring fine control of a work tool and high loads at the front of the machine. The disclosed suspension system provides both a comfortable ride for the operator and acceptable machine performance in its intended applications. Moreover, the suspension system can be configured with a simpler four-bar linkage, provided attention is paid to the torsion axle orientations.

While the disclosure has been described with reference to details of the illustrated embodiments, these details are not intended to limit the scope of the disclosure as defined in the appended claims. For example, suspension systems with both torsion arms having second quadrant orientations, or with either the front or rear torsion arm having a second quadrant orientation may also be provided. Moreover, for applications having higher loads at the rear of the machine, such as tracked agricultural tractors, it may be desirable to position the rear torsion arm in the first quadrant and the front torsion arm in either the first or third quadrant. Other aspects, objects and advantages of this disclosure can be obtained from a study of the drawings, the disclosure, and the appended claims.

What is claimed is:

1. A machine comprising:
   a frame;
   an undercarriage;
   a first torsion axle assembly connecting the frame to the undercarriage, the first torsion axle assembly including a first torsion shaft assembly, a first torsion arm, and a first axle, the first torsion shaft assembly attaches to and extends from the frame, the first torsion arm attaches to the first torsion shaft assembly at one of a plurality of preset selectable rotational attachment orientations, the first axle attaches to and extends from the first torsion arm a distance from the first torsion shaft assembly, and the first axle attaches to the undercarriage; and
   a second torsion axle assembly connecting the frame to the undercarriage, the second torsion axle assembly including a second torsion shaft assembly, a second torsion arm, and a second axle, the second torsion shaft assembly attaches to and extends from the frame, the second torsion arm attaches to the second torsion shaft assembly at one of the plurality of preset selectable rotational attachment orientations, the second axle attaches to and extends from the second torsion arm a distance from the second torsion shaft assembly, and the second axle attaches to the undercarriage,
   wherein the undercarriage comprises a roller frame and the first axle is attached to an upper surface of the roller frame and the second axle extends through the roller frame.

2. The machine of claim 1 further comprising:
   a third torsion axle assembly connecting the frame to the undercarriage, the third torsion axle assembly including a third torsion shaft assembly, a third torsion arm, and a third axle, the third torsion shaft assembly attaches to and extends from the frame on a side substantially opposite of the first torsion axle assembly, the third torsion arm attaches to the third torsion shaft assembly at one of the plurality of preset selectable rotational attachment orientations correlating to the rotational orientation of the first torsion arm, the third axle attaches to and extends from the third torsion arm a distance from the third torsion shaft assembly, and the third axle attaches to the undercarriage.

3. The machine of claim 2 further comprising:
   a fourth torsion axle assembly connecting the frame to the undercarriage, the fourth torsion axle assembly including a fourth torsion shaft assembly, a fourth torsion arm, and a fourth axle, the fourth torsion shaft assembly attaches to and extends from the frame on a side substantially opposite of the second torsion axle assembly, the fourth torsion arm attaches to the fourth torsion shaft assembly at one of the plurality of preset selectable rotational attachment orientations correlating to the rotational orientation of the second torsion arm, the fourth axle attaches to and extends from the fourth torsion arm a distance from the fourth torsion shaft assembly, and the fourth axle attaches to the undercarriage.

4. The machine of claim 3, wherein the torsion axle assemblies are all positioned on the machine forward of a center of gravity for the machine.

5. The machine of claim 1, wherein the first torsion shaft assembly further comprises:
   an outer tube;
   an inner bar; and
   a plurality of elastomeric cords, wherein the plurality of elastomeric cords hold the inner bar substantially in place inside the outer tube.

6. The machine of claim 5, wherein the outer tube and the inner bar both have a substantially square shaped cross section, and wherein the square shaped cross section of the inner bar is oriented approximately 90 degrees relative to the square shaped cross section of the outer tube.

7. The machine of claim 1, further comprising: at least one lift arm pivotally attached to the frame.

8. The machine of claim 7, further comprising:
   a bucket implement coupled to the at least one lift arm.

9. The machine of claim 1, wherein the undercarriage further comprises:
   a plurality of rollers rotatably attached to the roller frame;
   a rear idler rotatably attached to the roller frame;
   a drive sprocket rotatably attached to the roller frame;
   a moveable frame translatably attached to the roller frame,
   a front idler rotatably attached to the moveable frame;
   a front roller rotatably attached to the moveable frame; and
   an endless track encircling the undercarriage.

10. The machine of claim 1, wherein the first axle has a substantially circular cross sectional shape.

11. A suspension system for a machine having a frame and an undercarriage supporting the frame, the suspension system comprising:
   a first torsion axle assembly attached between the frame and the undercarriage, the first torsion axle assembly including a first torsion shaft attached to the frame, a first torsion arm attached to the first torsion shaft at setup at one of a plurality of preset selectable rotational attachment orientations, and extending rearward with respect to a direction of travel for the machine, and a first axle attached to the first torsion arm and to the undercarriage;

a second torsion axle assembly attached between the frame and the undercarriage, the second torsion axle assembly including a second torsion shaft attached to the frame, a second torsion arm attached to the second torsion shaft at setup at one of a plurality of preset selectable starting rotational attachment orientations, and extending frontward with respect to the direction of travel for the machine, and a second axle attached to the second torsion arm and to the undercarriage;

a third torsion axle assembly attached between the frame and the undercarriage, the third torsion axle assembly including a third torsion shaft attached to the frame, a third torsion arm attached to the third torsion shaft at setup at one of a plurality of preset selectable rotational attachment orientations, and extending rearward with respect to the direction of travel for the machine, and a third axle attached to the third torsion arm and to the undercarriage; and a fourth torsion axle assembly attached between the frame and the undercarriage, the fourth torsion axle assembly including a fourth torsion shaft attached to the frame, a fourth torsion arm attached to the fourth torsion shaft at setup at one of a plurality of preset selectable rotational attachment orientations, and extending frontward with respect to the direction of travel for the machine, and a fourth axle attached to the fourth torsion arm and to the undercarriage, wherein the torsion axle assemblies are all positioned on the machine forward of a center of gravity for the machine.

12. The suspension system of claim 11 wherein one or more of the axles have a substantially round cross sectional shape.

13. The suspension system of claim 11 wherein one or more of the torsion axle assemblies comprise:
an outer tube;
an inner bar; and
a plurality of flexible cords positioned between inner bar and the outer tube.

14. The suspension system of claim 13, further comprising:
a mounting bracket coupled with the outer tube and fastened to the frame, thereby limiting movement of the torsion axle assemblies relative to the frame.

15. A machine suspension system coupling a machine frame to a machine undercarriage, the suspension system comprising:
a first front torsion axle assembly connected to a first side of the frame via a first front torsion shaft preset at setup in a selected attachment orientation from a plurality of attachment orientations, and having a first front axle cantilevered above and rearward of the first front torsion shaft, the first front axle coupled to the undercarriage;
a second front torsion axle assembly connected to a second side of the frame via a second front torsion shaft preset at setup in a selected attachment orientation from a plurality of attachment orientations, and having a second front axle cantilevered above and rearward of the second front torsion shaft, the second front axle coupled to the undercarriage, the second side of the frame being substantially opposite of the first side of the frame;
a first rear torsion axle assembly connected to a first side of the frame via a first rear torsion shaft and having a first rear axle preset to be cantilevered below and forward of the first rear torsion shaft, the first rear axle coupled to the undercarriage; and
a second rear torsion axle assembly connected to the second side of the frame via a second rear torsion shaft and having a second rear axle preset to be cantilevered below and forward of the second rear torsion shaft, the second rear axle coupled to the undercarriage,
wherein the undercarriage has a roller frame and the first front axle is attached to an upper surface of the roller frame and the first rear axle extends through the roller frame.

16. The machine suspension system of claim 15 wherein the axles are configured with a substantially circular cross sectional shape.

* * * * *